(12) United States Patent
Shinzaki

(10) Patent No.: US 6,765,470 B2
(45) Date of Patent: Jul. 20, 2004

(54) MOBILE ELECTRONIC APPARATUS HAVING FUNCTION OF VERIFYING A USER BY BIOMETRICS INFORMATION

(75) Inventor: Takashi Shinzaki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 576 days.

(21) Appl. No.: 09/775,654

(22) Filed: Feb. 5, 2001

(65) Prior Publication Data
US 2001/0017584 A1 Aug. 30, 2001

(30) Foreign Application Priority Data
Feb. 24, 2000 (JP) ........................................ 2000-047486

(51) Int. Cl.$^7$ ................................................ H04Q 9/00
(52) U.S. Cl. ............... 340/5.52; 340/5.53; 340/5.6; 340/5.8; 340/5.81; 340/5.82; 340/5.83; 340/5.54; 340/5.85; 382/115; 382/124; 382/125; 713/184; 713/185; 713/186; 235/380
(58) Field of Search ................ 340/5.52, 5.53, 340/5.6, 5.74, 5.8, 5.54, 5.81, 5.82, 5.83, 5.85; 382/115, 124, 125; 713/184, 186, 185, 201; 235/380

(56) References Cited

U.S. PATENT DOCUMENTS 5,745,046 A * 4/1998 Itsumi et al. ............... 340/5.83
6,070,794 A * 6/2000 Niwata et al. .............. 235/380
6,085,323 A * 7/2000 Shimizu et al. ............. 713/201

FOREIGN PATENT DOCUMENTS

| DE | 41 25 198 C1 | 5/1992 |
| DE | 299 04 747 U1 | 7/1999 |
| DE | 198 18 889 A1 | 11/1999 |
| DE | 198 59 409 A1 | 7/2000 |

* cited by examiner

Primary Examiner—Ario Etienne
Assistant Examiner—Yves Dalencourt
(74) Attorney, Agent, or Firm—Staas & Halsey LLP

(57) ABSTRACT

A mobile electronic apparatus in which biometrics information, free from being stolen or faked by a unauthorized person, is used for user verification, virtually perfectly protecting an authorized user's personal data stored in a storing section of the apparatus. A verifying section compares a user's biometrics feature information with the authorized user's reference biometrics feature information to discriminate whether the fingerprint feature information for verification matches the reference fingerprint feature information. If it matches, a display control section reads out the personal data stored in the storing section and controls a display section to display the read-out personal data. The apparatus is useful when applied to a portable telephone, an electronic information terminal, or the like, so long as it has a function of user verification by biometrics information (fingerprint, palmprint, finger shape, hand shape, voiceprint, retina, iris, facial recognition, signature dynamics, blood vessel pattern, key strokes, etc.).

34 Claims, 13 Drawing Sheets

MOBILE ELECTRONIC APPARATUS HAVING FUNCTION OF VERIFYING A USER BY BIOMETRICS INFORMATION

BACKGROUND OF THE INVENTION

1. Field of the Invention

The present invention relates to a mobile electronic apparatus (a portable telephone, a portable electronic information terminal, etc.) storing various types of personal data, and more particularly to a mobile electronic apparatus equipped with a function of verifying a user by biometrics information (fingerprint, palmprint, finger shape, hand shape, voiceprint, retina, iris, facial recognition, signature dynamics, blood vessel pattern, key strokes, etc.).

2. Description of the Related Art

Multifunctional mobile electronic apparatuses (various types of potable electronic information terminals and portable telephones) nowadays not only function as electronic notebooks or telephones but also receive/transmit electronic information and image information via wired/wireless networks. Further, such mobile electronic apparatuses can also be used in bank account settlement, electronic commerce, or securities trading. For realizing these varying functions in one mobile electronic apparatus, various types of applications are started or executed in the mobile electronic apparatus.

When such applications are started or executed in the mobile electronic apparatus, an ID and a password must be input for each application. Likewise, when bank account settlement or electronic commerce is made, a bank account number and a personal identification number (PIN) must be input.

In general, ID and bank account number are previously stored in a memory or the like so that the user is unnecessary to input such numbers by himself/herself, while the password and the PIN must be input by the user with push or touch buttons (ten keys) for verifying the user.

However, these conventional mobile electronic apparatus have the following problems.

When plural types of applications or plural bank accounts are used in one mobile electronic apparatus, plural passwords or PINs can be used one for each application ID or bank account. This occasionally would make it difficult for the user to remember which one is for which.

An idea could be considered to store the passwords or the PINs in the mobile electronic apparatus in correlation with the application IDs or bank accounts. In mobile electronic apparatuses currently put on the market, however, even if various types of personal data (secret information) such as passwords or PINs are stored, there have been equipped with no system to protect or guard the stored information. This is a serious problem in security despite of the great convenience realized by the function of bank account settlement, electronic commerce, or stock trade.

Yet many of users tend to use an easy-to-remember string of characters or digits as a password or a PIN; for example, the user's or family member's name or birthday, telephone number, favorite word, etc. Assuming that a mobile electronic apparatus with such passwords or PINs registered is stolen or lost, it is a danger that an unauthorized person might use the function of bank account settlement or electronic commerce equipped in the apparatus.

Using passwords or PINs in user verification makes the system simple with reduced manufacturing cost, but it would be inevitable that the user should be security-conscious. Otherwise if hard-to-remember passwords or PINs are used in an effort to increase the security, the user might happen to forget them. If the passwords or PINs are stored in the mobile electronic apparatus for user's convenience, they are easy to read out also by an unauthorized person because of the poor security so that the unauthorized person can use the above-mentioned function on the apparatus.

Thus, in order to protect or guard user's various personal data (secret information) including passwords or PINs stored in a mobile electronic apparatus, the user verification by biometrics information, free from user-dependent security setting, has long been cherished in the market.

The biometrics information, which is the vital feature unique to a user, is presumably one of the ideal tools to eliminate the security problem, such as peeping by an unauthorized person.

SUMMARY OF THE INVENTION

With the foregoing problems in view, it is an object of the present invention to provide a mobile electronic apparatus in which biometrics information, free of fraud or theft, is used to verify a user so that the user's personal data is most safely protected against any unauthorized user, thus realizing an improved degree of security.

In order to accomplish the above object, according to a first concept of the present invention, there is provided a mobile electronic apparatus equipped with a function of verifying a user using the user's biometrics information, comprising: an input section for measuring biometrics information unique to a user to be verified and receiving the biometrics information; an extracting section for extracting, from the biometrics information measured and received by the input section, biometrics feature information for verification; a verifying section for comparing the biometrics feature information, which is extracted by the extracting section, with reference biometrics feature information unique to an authorized user to verify whether the user's biometrics feature information matches the authorized user's reference biometrics feature information; a storing section for storing personal data of the authorized user; a display section for displaying various types of information; and a display control section for controlling a state of displaying on the display section, the display control section being operative, if the result of the verification by the verifying section is positive, to read out the personal data of the authorized user from the storing section and control the display section to display the personal data thereon.

As a first preferable feature, the authorized user is an owner of the mobile electronic apparatus.

As a second preferable feature, the mobile electronic apparatus further comprises an interface section, adapted to be connected to an external apparatus, for outputting the personal data to the external apparatus if the result of the verification by the verifying section is positive. As an additional feature to the first or second feature of the present invention, the personal data is a personal identification code including a password, a personal identification number, or a secret key.

As a third preferable feature, the storing section stores the authorized user's personal data in correlation with designation information designating the personal data, and the mobile electronic apparatus further comprises a designation information selecting section, which selects the designation information so as to specify the personal data to be displayed on the display section; if the result of the verification is positive, the display control section reads out from the storing section the personal data specified by the designation information selected by the designation information selecting section, and controls the display section to display the specified personal data thereon.

As an additional feature to the third preferable feature, the mobile electronic apparatus further comprises an interface section, adapted to be connected to an external apparatus, for outputting the personal data specified by the designation information selected by the designation information selecting section to the external apparatus if the result of the verification is positive. As another additional feature, the personal data is a personal identification code including a password, a personal identification number, or a secret key; and the designation information may be account information corresponding to the personal data and including an account name, an ID, a computer name, or an IP address.

As a fourth preferable feature, the storing section stores the authorized user's personal data in correlation with both designation information designating the personal data and generic information that specifies both the personal data and the designation information, and the mobile electronic apparatus further comprises a generic information selecting section for selecting the generic information specifying both the personal data and the designation information to be displayed on the display section; if the result of the verification is positive, the display control section reads out from the storing section the personal data and the designation information, which are specified by the generic information selected by the generic information selecting section, and controls the display section to display the specified personal data and designation information thereon.

As an additional feature to the fourth preferable feature, the mobile electronic apparatus further comprises an interface section, adapted to be connected to an external apparatus, for outputting the personal data and the designation information, which are specified by the generic information selected by the generic information selecting section, to the external apparatus if the result of the verification is positive. As another additional feature, the personal data is a personal identification code including a password, a personal identification number, or a secret key; the designation information is account information corresponding to the personal data and including an account name, an ID, a computer name, or an IP address; and the generic information is a system name corresponding to the account information.

According to a second concept of the present invention, there is provided a mobile electronic apparatus equipped with a function of verifying a user using the user's biometrics information, comprising: an input section for measuring biometrics information unique to a user to be verified and receiving the biometrics information; an extracting section for extracting, from the biometrics information measured and received by the input section, biometrics feature information for verification; a verifying section for comparing the biometrics feature information, which is extracted by the extracting section, with reference biometrics feature information unique to an authorized user to verify whether the user's biometrics feature information matches the authorized user's reference biometrics feature information; a memory section for storing personal data of the authorized user; and an access control section for controlling access to the personal data, which is stored in the memory section, if the result of the verification is positive.

Preferably, the authorized user is an owner of the mobile electronic apparatus.

As another preferable feature, the mobile electronic apparatus further comprises an interface section, adapted to be connected to an information apparatus, for inputting and outputting the personal data from and to the information apparatus through the interface section if the result of the verification is positive. Further, the memory section functions as an extended drive medium of the information apparatus. Additionally, the type of the interface section is selected in accordance with an interface system of the information apparatus.

As still another preferable feature, the mobile electronic apparatus further comprises a storing section for previously storing the reference biometrics feature information.

As a further preferable feature, the mobile electronic apparatus further comprises: a medium interface section, adapted to be connected to a portable memory medium previously storing the reference biometrics feature information; and a read-out section for reading out the reference biometrics feature information from the portable memory medium through the medium interface section. The portable memory medium may be an IC card.

As an additional preferable feature, the mobile electronic apparatus further comprises a communications section for receiving the reference biometrics feature information from the external apparatus.

As still another preferable feature, the input section at least is disposed on a detachable element of the mobile electronic apparatus. As an additional feature to the tenth feature of the present invention, the detachable element is a battery pack.

With the mobile electronic apparatus equipped with a function of verifying a user by biometrics information of the present invention, if it is recognized by the input section, the extracting section, and the verifying section, that the biometrics feature information for verification matches the authorized user's, personal data (password, personal identification number (PIN), and secret key, etc.) is read out from the storing section to be displayed on the display section. It is thus possible to manage and preserve the user's (the authorized user's) personal data by verifying the biometrics information. In other words, it is possible to protect or guard the authorized user's personal data stored in the mobile electronic apparatus using biometrics information, which is free of fraud or theft.

Accordingly, user verification must be made using biometrics information such as a fingerprint, before displaying a password (PIN) to check. Thus, even if a user cannot remember a password (PIN) that has been randomly set, the user can use the mobile electronic apparatus to obtain the password, ensuring a high degree of security for the personal data. The same thing can be said for a secret key. At that time, since the personal data such as a password is merely displayed on the display section and it is the user who actually inputs a password, PIN, or secret key, the mobile electronic apparatus of the present invention is applicable between different systems.

Further, the authorized user's personal data (password, PIN, secret key, etc.) is stored in correlation with designation information (account name, ID, computer name, IP address, etc.) designating the personal data. After user verification is successfully made, the personal data specified by the designation information selected by the designation information selecting section is displayed on the display section. In this manner, even if plural types of personal data are being stored, a user can selectively display desired personal data on the display section using the designation information.

Further, the authorized user's personal data (password, PIN, secret key, etc.) is stored in correlation with both designation information (account name, ID, computer name, IP address, etc.) and generic information (system name, etc.). After user verification is successfully made, the personal data and the designation information, which are specified by the generic information selected by the generic information selecting section, is displayed on the display section. In this manner, even if plural types of personal data are stored, a user can selectively display desired personal data and desired designation information to be checked on the display section using the generic information, thus making it possible to assist when a user cannot remember not only a password but also an ID.

Since the personal data (password, PIN, secret key, etc.) can be output from an interface section to an external apparatus after user verification, it is possible to display the personal data on the display section for check and also to directly output the personal data to the external apparatus (mobile electronic information terminal, personal computer, etc.), improving the user-friendliness.

The personal data (password, PIN, secret key, etc.) specified by the designation information (account name, ID, computer name, IP address, etc.) selected by the designation information selecting section can be output from the interface section to an external apparatus after user verification. Therefore, even if plural types of personal data are stored, it is possible to selectively display the desired personal data, which is to be checked on the display section, using the designation information and also to directly output the personal data to the external apparatus (mobile electronic information terminal, personal computer, etc.), further improving the user-friendliness.

Further, the personal data and the designation information, which are specified by the generic information selected by the generic information selecting section, can be output from the interface section to an external apparatus after user verification. Therefore, even if plural types of personal data are stored, it is possible to selectively display desired designation information and personal data, which is to be checked on the display section, using the generic information and also to directly output the designation information and the personal data to an external apparatus (mobile electronic information terminal, personal computer, etc.), further improving the user-friendliness.

Moreover, with the mobile electronic apparatus of the present invention having a function of verifying a user by biometrics information, if the input section, the extraction section, and the verifying section have recognized that biometrics feature information for verification matches the authorized user's feature information, the personal data in the memory section is allowed to be accessed. It is thus possible to manage and preserve the user's (the authorized user's) personal data by verifying biometrics information. In other words, it is possible to protect or guard the authorized user's personal data stored in the mobile electronic apparatus using biometrics information, fraud or theft of which is impossible. Accordingly, user verification must be made by biometrics information, such as a fingerprint, before accessing (reading or writing) the personal data stored in the mobile electronic apparatus, guaranteeing a highest degree of security.

Partly since the personal data is allowed to be accessed from an external information apparatus through the interface section after user verification, and partly since the memory section is adapted to be operable as an extended drive medium of the information apparatus, it is possible to use the memory section of the mobile electronic apparatus as a portable storage device equipped with a locking function utilizing biometrics information.

Further, since the type of the interface section can be selected in accordance with the interface system (USB, serial/parallel, Smart Media (trade name of Toshiba corporation), network terminal, etc.) of the information apparatus, it is possible to connect the mobile electronic apparatus to the information apparatus, irrespective of the type of the interface system of the information apparatus, for serving as an external storage device.

Since the mobile electronic apparatus of the present invention includes another storing section previously storing reference biometrics feature information, the mobile electronic apparatus can serve as an apparatus for an authorized user's personal use, whose biometrics feature information is registered in the storing section as reference biometrics feature information.

Further, since the mobile electronic apparatus includes a medium interface section adapted to be connected to a portable memory medium (IC card, etc.) previously storing the reference biometrics feature information and a read-out section for reading out the reference biometrics feature information from the portable memory medium through the medium interface section, only the authorized user, whose biometrics feature information is registered in the portable memory medium as reference biometrics feature information, is allowed to check or access the personal data stored in the storing section or the memory section.

Furthermore, since the mobile electronic apparatus of the present invention includes a communications section, adapted to be communicatably connected to an external apparatus, for receiving the reference biometrics feature information from the external apparatus, only the authorized user, whose biometrics feature information is received from the external apparatus through the communications section as reference biometrics feature information, is allowed to check or access the personal data stored in the storing section or the memory section.

Still further, since at least the input section (i.e., a part that is in charge of verifying a user by biometrics information) is disposed on a detachable element (battery pack, etc.) of the mobile electronic apparatus, a function of verifying a user by biometric information can be added to the mobile electronic apparatus in a simple manner, without impairing the mobility of the mobile electronic apparatus and without making any change to hardware of a mobile electronic apparatus currently put on the market.

Other objects and further features of the present invention will be apparent from the following detailed description when read in conjunction with the accompanying drawings.

DESCRIPTION OF THE PREFERRED EMBODIMENTS

Various preferred embodiments of the present invention will now be described in detail below with reference made to relevant accompanying drawings.

Figure 1:
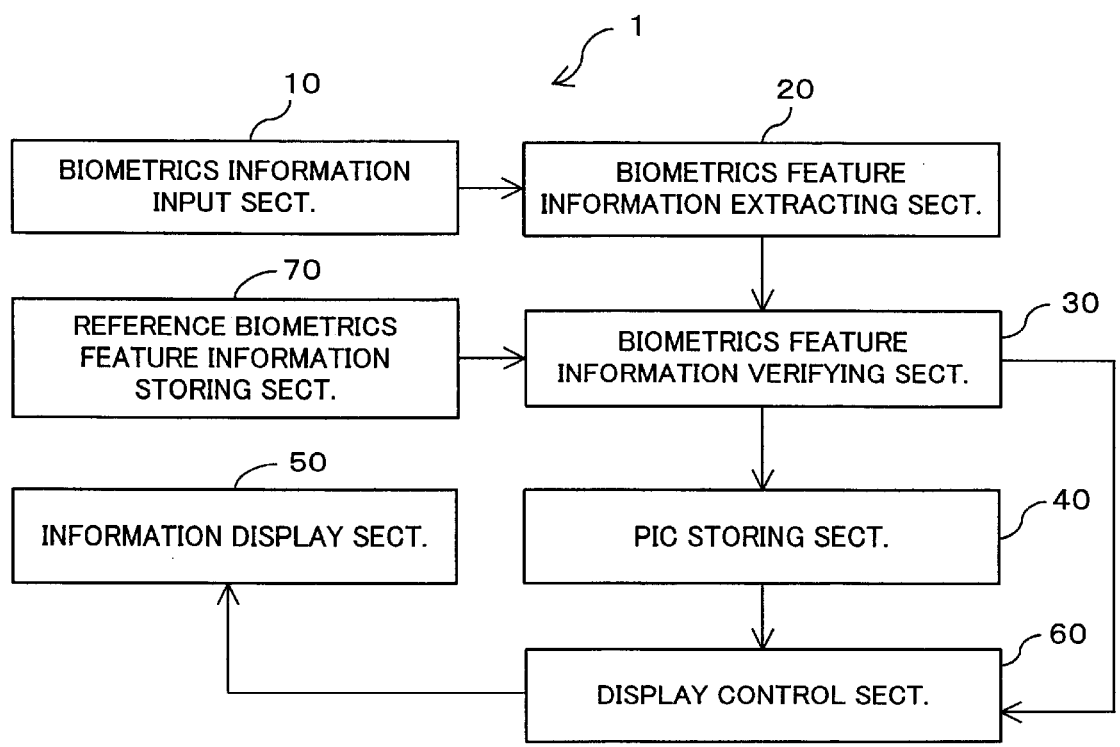
FIG. 1 is a block diagram showing a mobile electronic apparatus according to a first embodiment of the present invention.

(1) First Embodiment:

FIG. 1 shows a mobile electronic apparatus having a function of verifying a user according to a first embodiment of the present invention. As shown in FIG. 1, the mobile electronic apparatus 1 of the first embodiment, which stores various types of personal information of the authorized user, can make processing of various types of electronic information while the user carries about the apparatus 1. The mobile electronic apparatus 1 can be provided in the form of a portable telephone, a mobile electronic information terminal, or the like.

The mobile electronic apparatus 1 comprises a biometrics information input section 10, a biometrics feature information extracting section 20, a biometrics feature information verifying section 30, and a reference biometrics feature information storing section 70, for verifying a user by using biometrics information (fingerprint, palmprint, finger shape, hand shape, voiceprint, retina, iris, facial recognition, signature dynamics, blood vessel pattern, key strokes, etc.). The mobile electronic apparatus 1 further comprises a personal identification code (PIC) storing section 40, an information display section 50, and a display control section 60.

The biometrics information input section (input section) 10 measures and inputs biometrics information of a user to be verified.

The biometrics feature information extracting section (extracting section) 20 extracts biometrics feature information for verification from the biometrics information that has been measured and input by the biometrics information input section 10.

The reference biometrics feature information storing section (storing section) 70 previously stores reference biometrics feature information of an authorized user of the mobile electronic apparatus 1.

The biometrics feature information-verifying section (verifying section) 30 compares the biometrics feature information for verification that has been extracted by the biometrics feature information extracting section 20 with the reference biometrics feature information stored in the reference biometrics feature information storing section 70.

The PIC storing section (storing section) 40 previously stores personal data (PIC) of the authorized user of the mobile electronic apparatus 1. APIC stored as the authorized user's personal data includes a password, PIN, secret key, etc.

The information display section (display section) 50 displays various types of information thereon, and the display control section 60 controls the state of display of the information display section 50.

In the mobile electronic apparatus 1 of the first embodiment, the biometrics feature information verifying section (verifying section) 30 compares the biometrics feature information for verification with the reference biometrics feature information to verify whether the input biometrics feature information matches the reference biometric feature information. If the result of this verification is positive, the display control section 60 reads out the PIC from the PIC storing section 40 and controls the information display section 50 to display the PIC thereon.

The mobile electronic apparatus 1 comprises a CPU, ROM, RAM, and LCD, which are interconnected by a bus line. With this construction, the CPU serves as the biometrics feature information extracting section 20, the biometrics feature information verifying section 30, and the display control section 60; the ROM and the RAM, as the reference biometrics feature information storing section 70 and the PIC storing section 40; and the LCD, as the information display section 50. Therefore, the mobile electronic apparatus 1 according to the present embodiment can be realized without making a significant change to hardware of an existing mobile electronic apparatus (a portable telephone, portable electronic information terminal, etc.) but with adding only to the hardware the biometrics information input section 10.

Figure 2:
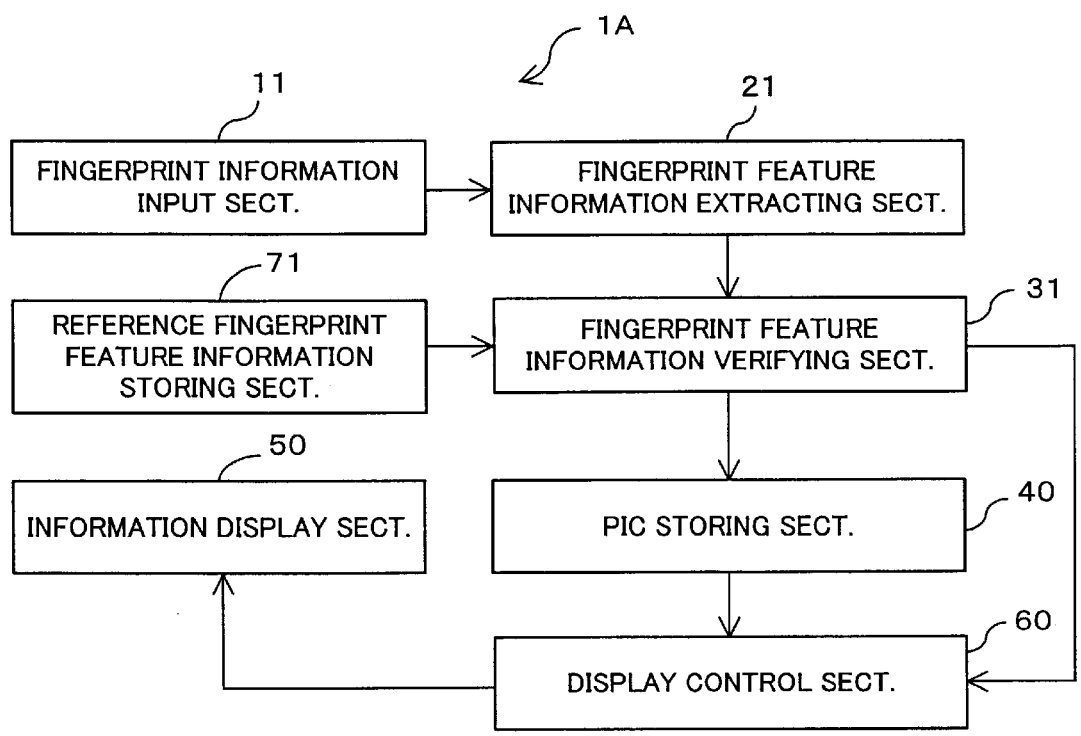
FIG. 2 is a block diagram showing the mobile electronic apparatus of the first embodiment, equipped with a verifying function using a fingerprint as biometrics feature information.

More specifically than in FIG. 1, FIG. 2 is a block diagram showing a specific example of the mobile electronic apparatus 1A according to the first embodiment of the present invention in which a fingerprint is employed as the biometrics information.

As shown in FIG. 2, the mobile electronic apparatus 1A comprises a fingerprint information input section 11, a fingerprint feature extracting section 21, a reference fingerprint feature information storing section 71, a fingerprint feature information verifying section 31, a PIC storing section 41, an information display section 50, and a display control section 60.

The fingerprint information input section (input section) 11 measures and inputs fingerprint information (image data of a fingerprint) of a user to be verified.

From the fingerprint information (image data) thus measured and input, the fingerprint feature extracting section 21 extracts fingerprint feature information which will be used for verifying a user (hereinbelow, also called fingerprint feature information for verification). Here, the feature information extracted from the fingerprint information (image data) is the coordinates of the following points: (1) ridge dividing points (feature points), ridge end points (feature points), ridge crossing points, the fingerprint core, and deltas; and (2) the ridge directions, distances between feature points, the number of ridges between feature points, and so on.

The reference fingerprint feature information storing section (storing section) 71 previously stores reference fingerprint feature information of the authorized user of the mobile electronic apparatus 1.

The fingerprint feature information verifying section (verifying section) 31 compares the fingerprint feature information for verification with the reference fingerprint feature information being stored in the reference fingerprint feature information storing section 71 to discriminate whether or not the input fingerprint feature information satisfies a predetermined matching condition with respect to the reference fingerprint feature information. If the result of the discrimination is positive, the fingerprint feature information for verification, which has been extracted by the fingerprint feature information extracting section 21, is judged matching the authorized user's. In this instance, the predetermined matching condition is such that the rate (degree) of matching between the input biometric feature information and the reference biometric feature information is equal to or larger than a predetermined value.

The PIC storing section 40, the information display section 50, and the display control section 60 are similar in function to those described in connection with the first embodiment of FIG. 1, so their detailed description is omitted here. In operation, in the mobile electronic apparatus 1A, like the mobile electronic apparatus 1, if the result of the verification by the fingerprint feature information verifying section 31 is positive, the display control section 60 reads out a PIC from the PIC storing section 40 and controls the information display section 50 to display the PIC thereon.

The mobile electronic apparatus 1A also comprises a CPU, ROM, RAM, and LCD, which are interconnected by a bus line. The CPU serves as the fingerprint feature information extracting section 21, the fingerprint feature information verifying section 31, and the display control section 60; the ROM and the RAM, as the reference fingerprint feature information storing section 71 and the PIC storing section 40; and the LCD, as the information display section 50. Therefore, the mobile electronic apparatus 1A of FIG. 2 can be realized without making a significant change to hardware of an existing mobile electronic apparatus (a portable telephone, portable electronic information terminal, etc.) but with only adding to the hardware the fingerprint information input section 11.

In the thus constructed mobile electronic apparatus 1A of FIG. 2, a user first puts his/her finger tip on the fingerprint information input section 11. Then the fingerprint image data of the finger (fingerprint information) is measured and captured, which data is then converted into fingerprint feature information for verification by the fingerprint feature information extracting section 21.

After that, the fingerprint feature information verifying section 31 reads out the reference fingerprint feature information of an authorized user, which information has been previously stored in the reference fingerprint feature information storing section 71, to compare the reference fingerprint feature information with the fingerprint feature information for verification.

If the result of the comparison indicates that the fingerprint feature information for verification matches the reference fingerprint feature information, the display control section 60 reads out PIC information corresponding to the input fingerprint from the PIC storing section 40, and controls the information display section 50 to display the PIC information thereon. Assuming that a user needs his/her password, the user should do nothing except inputting his/her fingerprint to check the previously registered password on the display of the mobile electronic apparatus 1A.

Further, plural passwords for plural systems can be registered in correlation with one for each of plural fingerprints. For example, the fingerprint of the forefinger of the right hand is registered in correlation with one password for system A; the fingerprint of the forefinger of the left hand, another password for system B. When the fingerprint of forefinger of the right hand is input, the password for system A is displayed on the display section 50; when the fingerprint of forefinger of the left hand, the password for system B.

This mobile electronic apparatus 1A allows a user to see his/her PIC, including a password, on the display section 50 at hand so that the user can be freed from worrying about forgetting a password, even if the password was randomly set from no connection with his/her personal information.

The mobile electronic apparatus 1A is energized by a battery power source, facilitating its mobility. In use, a user inputs by himself/herself a PIC (password, PIN, secret key, etc.), which has been displayed on the display section 50. Therefore, the mobile electronic apparatus 1A can be used, irrespective of the types of interface system of the hardware to which the PIC is input. Further, not only the PIC, such as a password, but also account information (ID) can be displayed on the display section 50, improving the user-friendliness.

According to the mobile electronic apparatus 1A(1) of the first embodiment, if the fingerprint input section 11 (10), the fingerprint feature information extracting section 21 (20), and the fingerprint feature information verifying section 31 (30), recognize that the biometrics feature information for verification matches the authorized user's biometrics feature information, the personal data, including a password, PIN, and secret key, is read out from the PIC storing section 40 for being displayed on the display section 50. In this manner, the mobile electronic apparatus 1, 1A can be equipped with a function of managing and preserving the user's (the authorized user's) personal data by verifying biometrics information. In other words, it is possible to protect or guard the authorized user's personal data stored in the mobile electronic apparatus 1, 1A, by using biometrics information (fingerprint information), which is free of being stolen or faked.

Accordingly, a password (PIN) cannot be displayed until after user verification is made using biometrics information, such as a fingerprint. Thus even if only the authorized user cannot remember a randomly set password (PIN), he/she can use the mobile electronic apparatus to obtain the password stored therein, guaranteeing a highest degree of security. The same thing can be said for a secret key. At that time, partly since the personal data such as a password is merely displayed on the display section and partly since a password, PIN, or secret key can be actually input by the user himself/herself, the mobile electronic apparatus 1, 1A of the first embodiment is applicable between different systems.

Further, reference biometrics feature information (reference biometrics feature information) is previously registered or stored in the reference fingerprint feature information storing section 71 (reference biometrics feature information storing section 70) which is built in the mobile electronic apparatus 1A(1). The mobile electronic apparatus 1A (1) thereby serves as an apparatus for dedicated use by an authorized user, whose fingerprint feature information is registered as reference fingerprint feature information (reference biometrics feature information).

In the foregoing embodiment, reference biometrics feature information and reference fingerprint feature information are stored in a memory (the storing section 70, 71) in the mobile electronic apparatus 1, 1A. The present invention should by no means be limited to the illustrated examples, and reference biometrics feature information (reference fingerprint feature information) may be received from an external apparatus via a memory medium interface (medium interface section), an integrated circuit (IC) card, a communications device, etc. This modification will now be described with reference to FIGS. 3 and 4.

Figure 3:
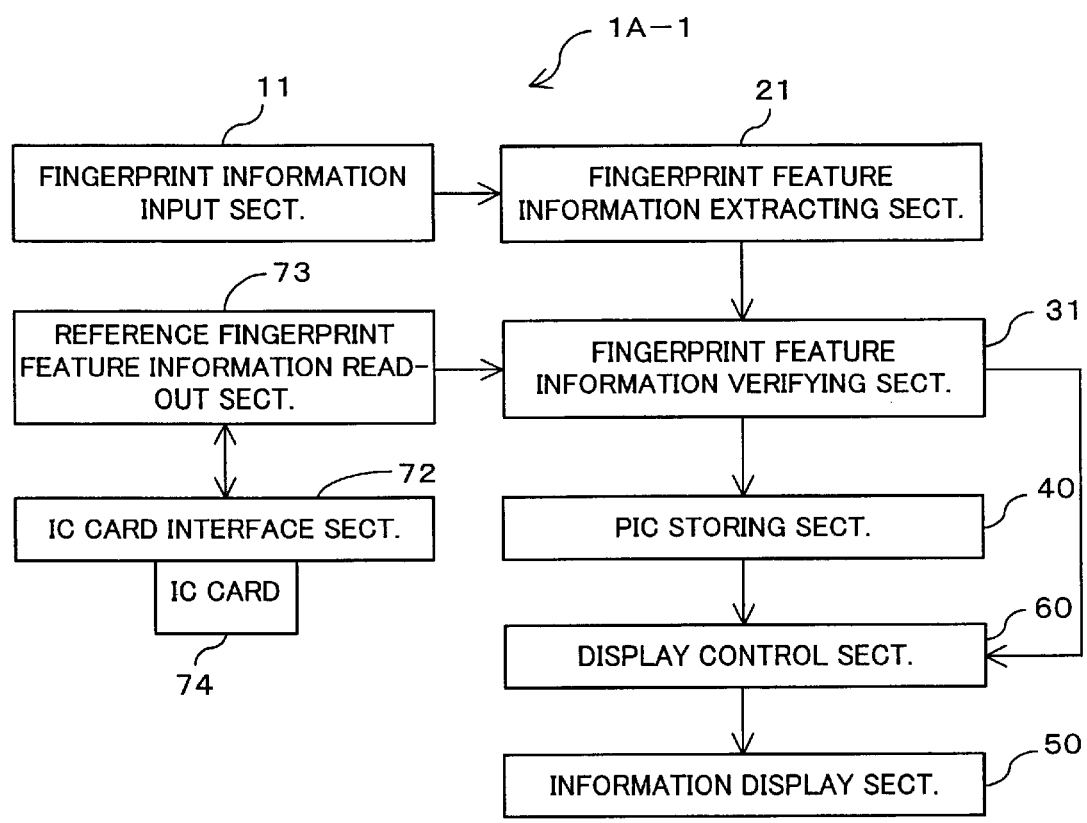
FIG. 3 is a block diagram showing a mobile electronic apparatus according to a first modification of the first embodiment.

FIG. 3 shows a mobile electronic apparatus according to the first modification of the first embodiment. In the mobile electronic apparatus 1A-1 of FIG. 3, reference fingerprint feature information (reference biometrics feature information) is previously stored or registered in an IC card 74, which is a portable memory medium. For this purpose, an IC card interface section 72 and a reference fingerprint feature information read-out section 73 are provided in place of the reference fingerprint feature information storing section 71.

The IC card interface section (medium interface section) 72 is connected with the IC card (portable memory medium) 74 in which reference fingerprint feature information is previously registered or stored. The reference fingerprint feature information read-out section (read-out section) 73 reads out from the IC card 74 the reference fingerprint feature information via the IC card interface section 72 to send the read-out information to the fingerprint feature information verifying section 31.

With this mobile electronic apparatus 1A-1, an authorized user, whose fingerprint feature information is registered in the IC card 74 as reference fingerprint feature information, can see his/her personal data (PIC), which is stored in the PIC storing section 40, on the display section 50.

At that time, as a portable memory medium, various types of memory media rather than the IC card may be used, being exemplified by a memory card, such as an optical card and a BioCard (commercially available with trade name), or a memory medium, such as a Smart Media (trade name of Toshiba Corporation) and a Memory Stick (trade name of SONY Corporation).

Figure 4:
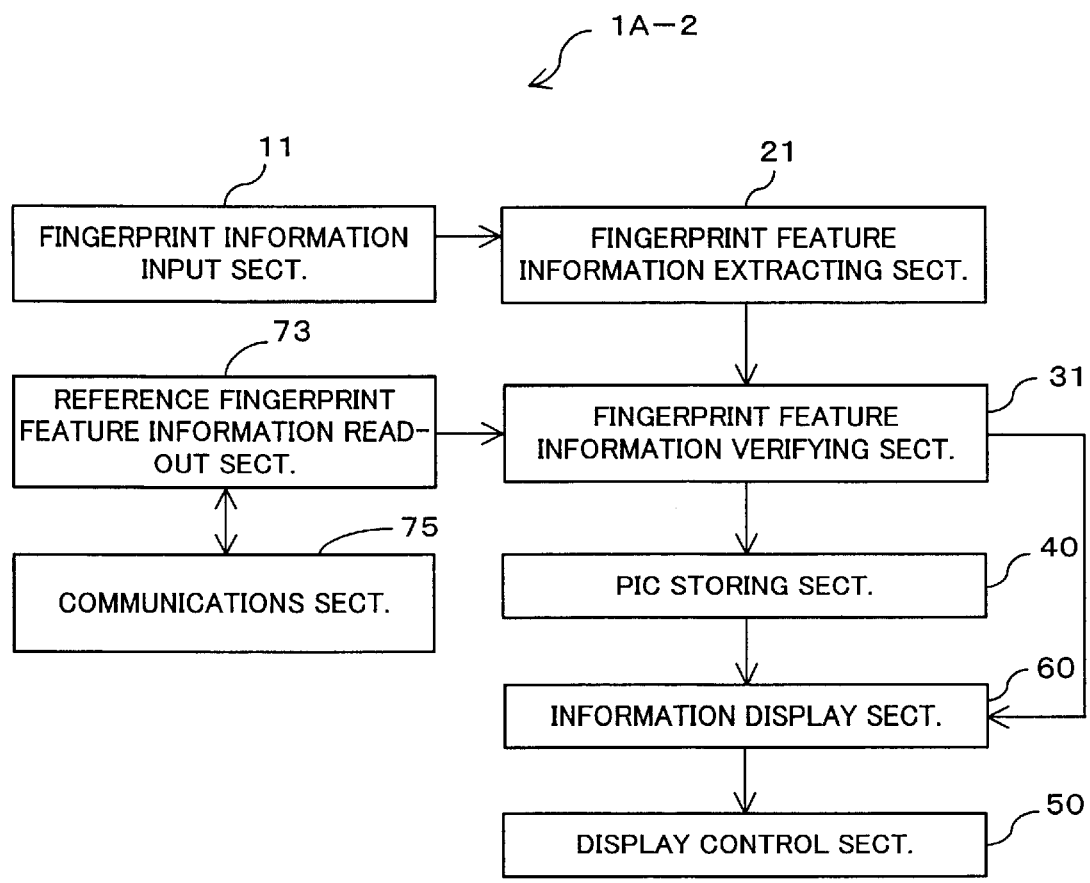
FIG. 4 is a block diagram showing a mobile electronic apparatus according to a second modification of the first embodiment.

FIG. 4 shows a mobile electronic apparatus according to the second modification of the specified example of the first embodiment. In the mobile electronic apparatus 1A-2 of FIG. 4, reference fingerprint feature information (reference biometrics feature information) is received from an external apparatus by wireless. For this purpose, a reference fingerprint feature information read-out section 73 (read-out section) and a communications section 75 are provided in place of the reference fingerprint feature information storing section 71.

The communications section 75 receives reference fingerprint feature information from an external apparatus by wireless, which information is then read out by the reference fingerprint feature information read-out section 73 for being output to the fingerprint feature information verifying section 31.

With this mobile electronic apparatus 1A-2, an authorized user, whose fingerprint feature information is received from an external apparatus via the communications section 75 as reference fingerprint feature information, can see his/her personal data (PIC), which is stored in the PIC storing section 40, on the display section 50.

Figure 5:
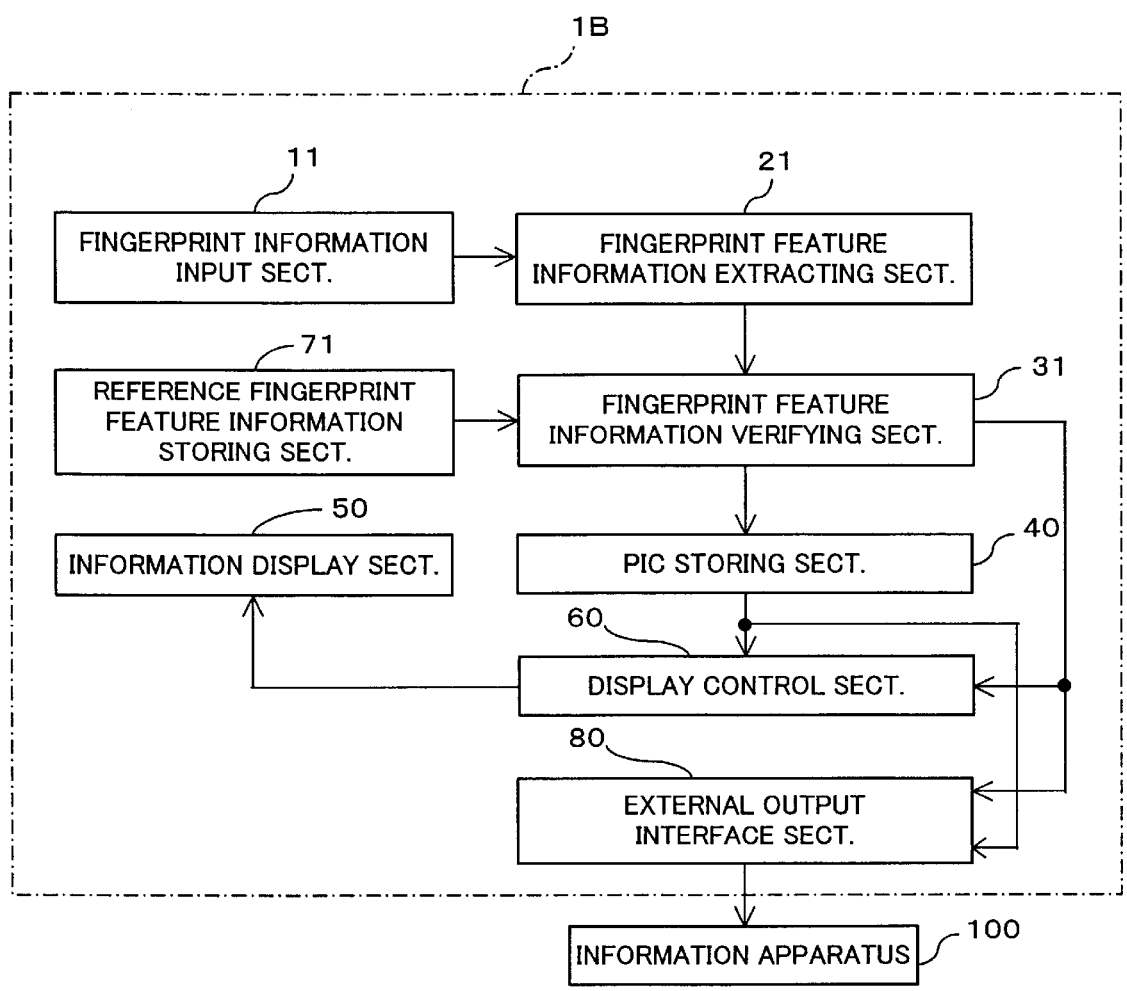
FIG. 5 is a block diagram showing a mobile electronic apparatus according to a second embodiment of the present invention.

(2) Second Embodiment:

FIG. 5 shows a mobile electronic apparatus according to a second embodiment of the present invention. The mobile electronic apparatus 1B of FIG. 5 is similar in construction to the mobile electronic apparatus 1A of FIG. 2 except that the latter further comprises an external output interface section 80. Like reference numbers designate similar parts or elements throughout several views, so their detailed description is omitted here.

The external output interface section (interface section) 80 is adapted to be connected to an information apparatus (external apparatus) 100, such as a mobile electronic terminal or a personal computer, for information output thereto. In the mobile electronic apparatus 1B of the second embodiment, fingerprint feature information for verification is compared with reference fingerprint feature information by the fingerprint feature information verifying section 31 to discriminate whether the fingerprint feature information for verification matches the reference fingerprint feature information. If the result of the verification is positive, an authorized user's personal data (PIC including password, PIN, or secret key) is read out from the PIC storing section 40 for being displayed on the display section 50 and being output to the external information apparatus 100 via the external output interface section 80.

With this the mobile electronic apparatus 1B of the second embodiment, after user verification is completed, the PIC (password, PIN, secret key, etc.) is output from the external output interface section 80 to the external information apparatus 100 so that the user can display the PIC on the display section 50 for confirmation and can directly output the PIC to the external information apparatus 100, thus further improving the user-friendliness.

As shown in FIGS. 3 and 4, in the mobile electronic apparatus 1B of the second embodiment, the reference fingerprint feature information storing section 71 may be substituted by the IC card interface section 72 and the reference fingerprint feature information read-out section 73, or by the reference fingerprint feature information read-out section 73 and the communications section 75, so that the reference biometrics feature information (reference fingerprint feature information) can be received from an external apparatus.

Figure 6:
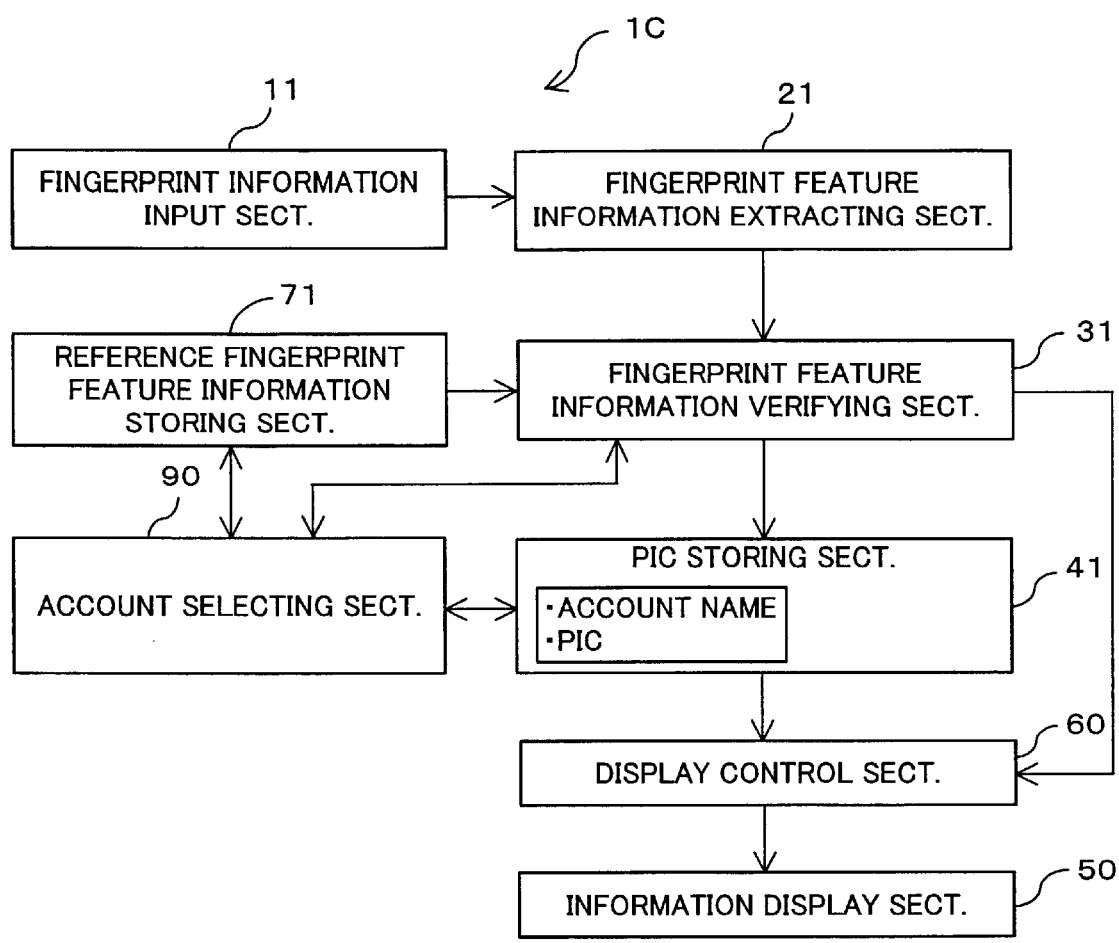
FIG. 6 is a block diagram showing a mobile electronic apparatus according to a third embodiment of the present invention.

(3) Third Embodiment:

FIG. 6 shows a mobile electronic apparatus according to a third embodiment of the present invention. The mobile electronic apparatus 1C of FIG. 6 is similar in construction to the mobile electronic apparatus 1A of FIG. 2 except that the latter is equipped with a PIC storing section 41 in place of the PIC storing section 40, and additionally has an account selecting section 90. Like reference numbers designate similar parts or elements throughout several views, so their detailed description is omitted here.

In the PIC storing section (storing section) 41 of the third embodiment, a PIN (personal data) including a password, PIN, or secret key is stored in correlation with designation information (account information including an account name, ID, computer name, or IP address; more specifically, a bank account number) for designating the PIC.

The account selecting section (designation information selecting section) 90 selects the account information so as to specify the PIN for being displayed on the display section 50. Specifically, a function of the account selecting section 90 is realized in such a manner that, after displaying the account information stored in the PIC storing section 41 on the display section 50 under control of the display control section 60, a user selects desired one of individual items of the displayed account information by positioning a cursor. Alternatively, the desired item of account information can be input on a keyboard, or the like. The account selecting section 90 will thus actually be in the form of a cursor key, key board, selecting button, touch panel, etc.

Then, the fingerprint feature information for verification is compared with the reference fingerprint feature information by the fingerprint feature information verifying section 31 to discriminate whether the fingerprint feature information for verification matches the reference feature information. If the result of the verification is positive, the display control section 60 reads out a PIC, which is correlated with the account information selected by the account selecting section 90, from the PIC storing section 41 and controls the display section 50 to display the PIC thereon.

With this mobile electronic apparatus 1C of the third embodiment, if an account for system A is input by a user before inputting a fingerprint, a password for system A is displayed on the display section 50; if an account for system B is input by a user before inputting a fingerprint, a password for system B is displayed on the display section 50.

In other words, a PIC including a password, PIN, or secret key is previously stored, in correlation with account information including an account name, ID, computer name, or IP address, in the PIC storing section 41. After user verification is completed, a PIC correlated with the account information selected by the account selecting section 90 is displayed on the display section 50. In this manner, even if plural types of PICs (personal data) are being stored, a user can selectively display only a desired PIC on the display section 50 using the account information (designation information).

Here, the selecting operation by the account selecting section 90 may be made either before or after verifying a user by his/her fingerprint.

As shown in FIGS. 3 and 4, also in the mobile electronic apparatus 1C of the third embodiment, the reference fingerprint feature information storing section 71 may be substituted by the IC card interface section 72 and the reference fingerprint feature information read-out section 73, or by the reference fingerprint feature information read-out section 73 and the communications section 75, so that the reference biometrics feature information (reference fingerprint feature information) can be received from an external apparatus.

Figure 7:
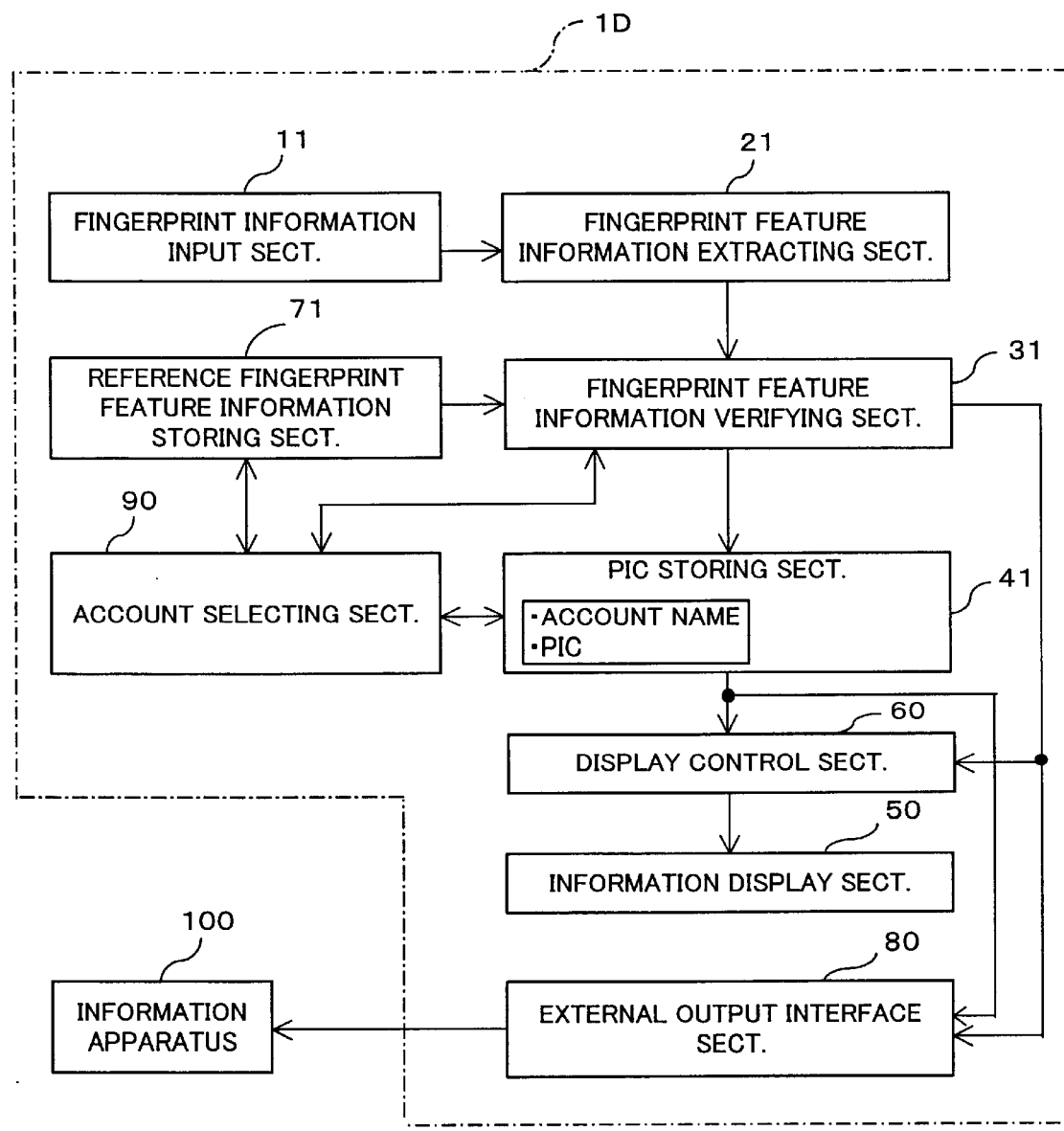
FIG. 7 is a block diagram showing a mobile electronic apparatus according to a fourth embodiment of the present invention.

(4) Fourth Embodiment:

FIG. 7 shows a mobile electronic apparatus according to a forth embodiment of the present invention. The mobile electronic apparatus 1D of FIG. 7 is similar in construction to the mobile electronic apparatus 1C according to the third embodiment of FIG. 6 except that the latter is further equipped with an external output interface section 80. Like reference numbers designate similar parts or elements throughout several views, so their detailed description is omitted here.

In the fourth embodiment, like the second embodiment, the external output interface section (interface section) 80 is adapted to be connected to an information apparatus (external apparatus) 100, such as a mobile electronic terminal or a personal computer, for information output thereto. In the mobile electronic apparatus 1D of the fourth embodiment, fingerprint feature information for verification is compared with reference fingerprint feature information by the fingerprint feature information verifying section 31 to discriminate whether the fingerprint feature information for verification matches the reference fingerprint feature information. If the result of the verification is positive, a PIC correlated to the account information selected by the account selecting section 90 is read out from the PIC storing section 41 for being displayed on the display section 50 and outputting to the external information apparatus 100 via the external output interface section 80.

With this mobile electronic apparatus 1D of the fourth embodiment, after completing user verification, personal data (password, PIN, secret key, etc.) correlated with the designation information (account name, ID, computer name, IP address, etc.) selected by the account selecting section 90 can be output from the external output interface section 80 to the external information apparatus 100. In this manner, even if plural types of personal data (PICs) a restored, a user can selectively display the desired personal data for checking on the display section 50 using the account information and also to directly output the desired PIC to the external information apparatus 100, further improving the user-friendliness.

As shown in FIGS. 3 and 4, also in the mobile electronic apparatus 1D of the fourth embodiment, the reference fingerprint feature information storing section 71 may be substituted by the IC card interface section 72 and the reference fingerprint feature information read-out section 73, or by the reference fingerprint feature information read-out section 73 and the communications section 75, so that the reference biometrics feature information (reference fingerprint feature information) is received from an external apparatus.

Figure 8:
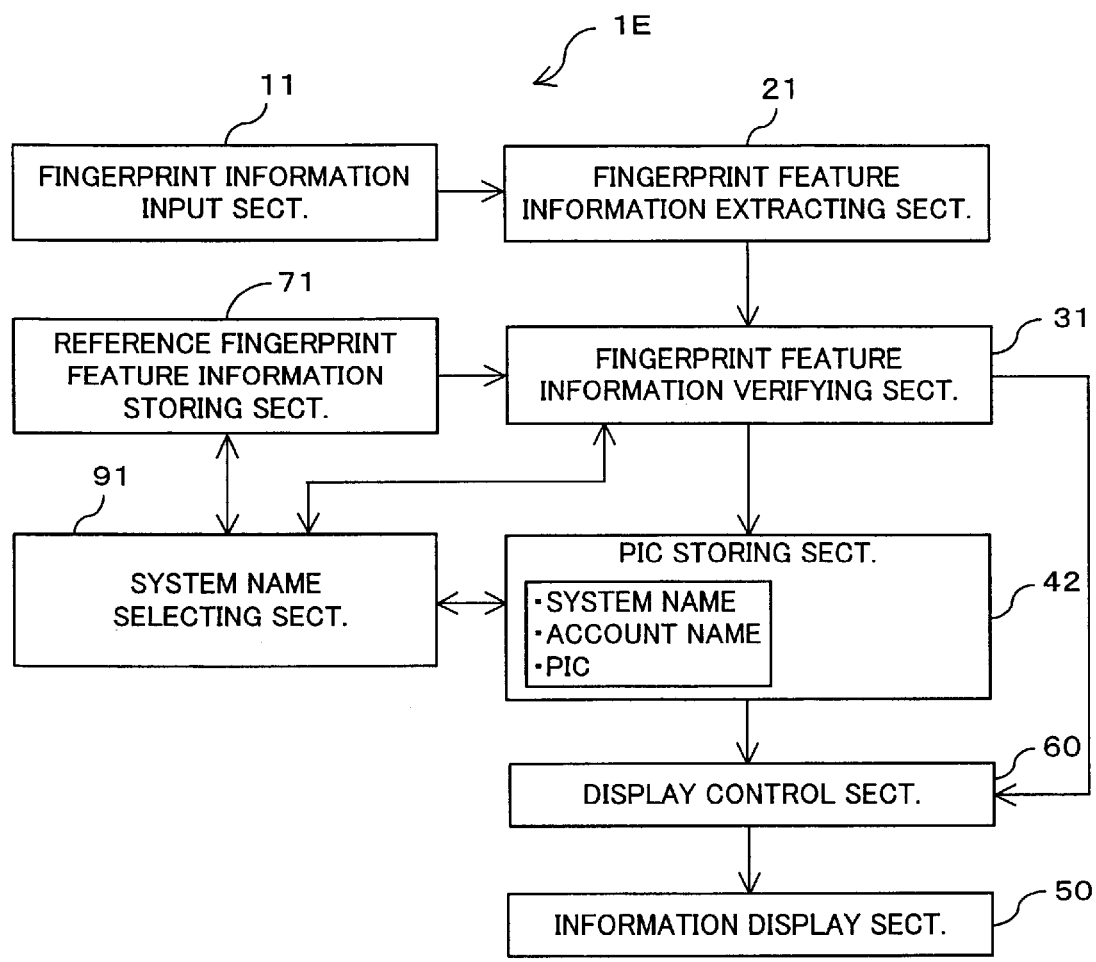
FIG. 8 is a block diagram showing a mobile electronic apparatus according to a fifth embodiment of the present invention.

(5) Fifth Embodiment:

FIG. 8 shows a mobile electronic apparatus according to a fifth embodiment of the present invention. The mobile electronic apparatus 1E of FIG. 8 is similar in construction to the mobile electronic apparatus 1A of the first embodiment of FIG. 2 except that the latter is equipped with a PIC storing section 42 in place of the PIC storing section 40, and additionally has a system name selecting section 91. Like reference numbers designate similar parts or elements throughout several views, so their detailed description is omitted here.

In the PIC storing section (storing section) 42 of the fifth embodiment, a PIC (personal data) including a password, PIN, or secret key is stored in correlation with designation information (account information including an account name, ID, computer name, or IP address; more specifically, a bank account number) for designating the PIC, and with generic information (system name corresponding to the account information; more specifically, bank name, application name, computer name, etc.) for specifying both the PIC and the account information.

The system name selecting section (generic information selecting section) 91 selects the system name to specify the PIC and the account information to be displayed on the display section 50. Specifically, an operation of the system name selecting section 91 is realized in such a manner that, after displaying system names stored in the PIC storing section 42 on the display section 50 under control of the display control section 60, a user selects desired one of the displayed system names by positioning a cursor. Alternatively, the desired system name may be input on a keyboard, or the like. The system name selecting section 91 will thus actually be in the form of a cursor key, key board, selecting button, touch panel, etc.

Then, the fingerprint feature information for verification is compared with the reference fingerprint feature information by the fingerprint feature information verifying section 31 to discriminate whether the fingerprint feature information for verification matches the reference fingerprint feature information. If the result of the verification is positive, the display control section 60 reads out a PIC and an account information, which are correlated with the system name selected by the system name selecting section 91, from the PIC storing section 42 and controls the display section 50 to display the PIC and the account information thereon.

With this mobile electronic apparatus 1E of the fifth embodiment, if a user selects a system name (bank name, application name, computer name), in spite of an account information, before inputting his/her fingerprint, both the account information and the PIC corresponding to the system are displayed on the display section 50.

Assuming that "ABC Bank" is selected before inputting a fingerprint, the bank account number of ABC Bank and the PIN for the bank card are displayed on the display section 50. Then if "company payment system" is selected, the user account and the password for the company payment system application are displayed. If a computer name is selected at remote login, the account and the password are displayed. If a name of a credit card is selected, the number of the credit card and the PIN are displayed. For coping with a coded document, the name of a specific CA (Certificate Authority) station and the corresponding secret key can be displayed. That is, in the mobile electronic apparatus of the fifth embodiment, a system name or an application name can be used as a generic retrieving key so that a user can be freed from worrying about forgetting an account itself or a correlation given between an account and a system.

A PIC, including a password, PIN, or secret key, is stored in the PIC storing section 42 in correlation with account information, including an account name, ID, computer name, or IP address, and with generic information, including a system name, bank name, computer name, or application name. After completing user verification, the PIC and the account information both correlated with the generic information selected by the system name selecting section 91 are displayed on the display section 50. Accordingly, even if plural types of PICS (personal data) are stored, a user can selectively display desired account information and a desired PIC for checking on the display section 50 using the generic information backing up a user's brain memory, which does not always perfectly remember a password or an ID.

Here, the selecting operation by the system name selecting section 91 may be made either before or after verifying a user by his/her fingerprint.

As shown in FIGS. 3 and 4, also in the mobile electronic apparatus 1E of the fifth embodiment, the reference fingerprint feature information storing section 71 may be substituted by the IC card interface section 72 and the reference fingerprint feature information read-out section 73, or by the reference fingerprint feature information read-out section 73 and the communications section 75, so that the reference biometrics feature information (reference fingerprint feature information) is received from an external apparatus.

Figure 9:
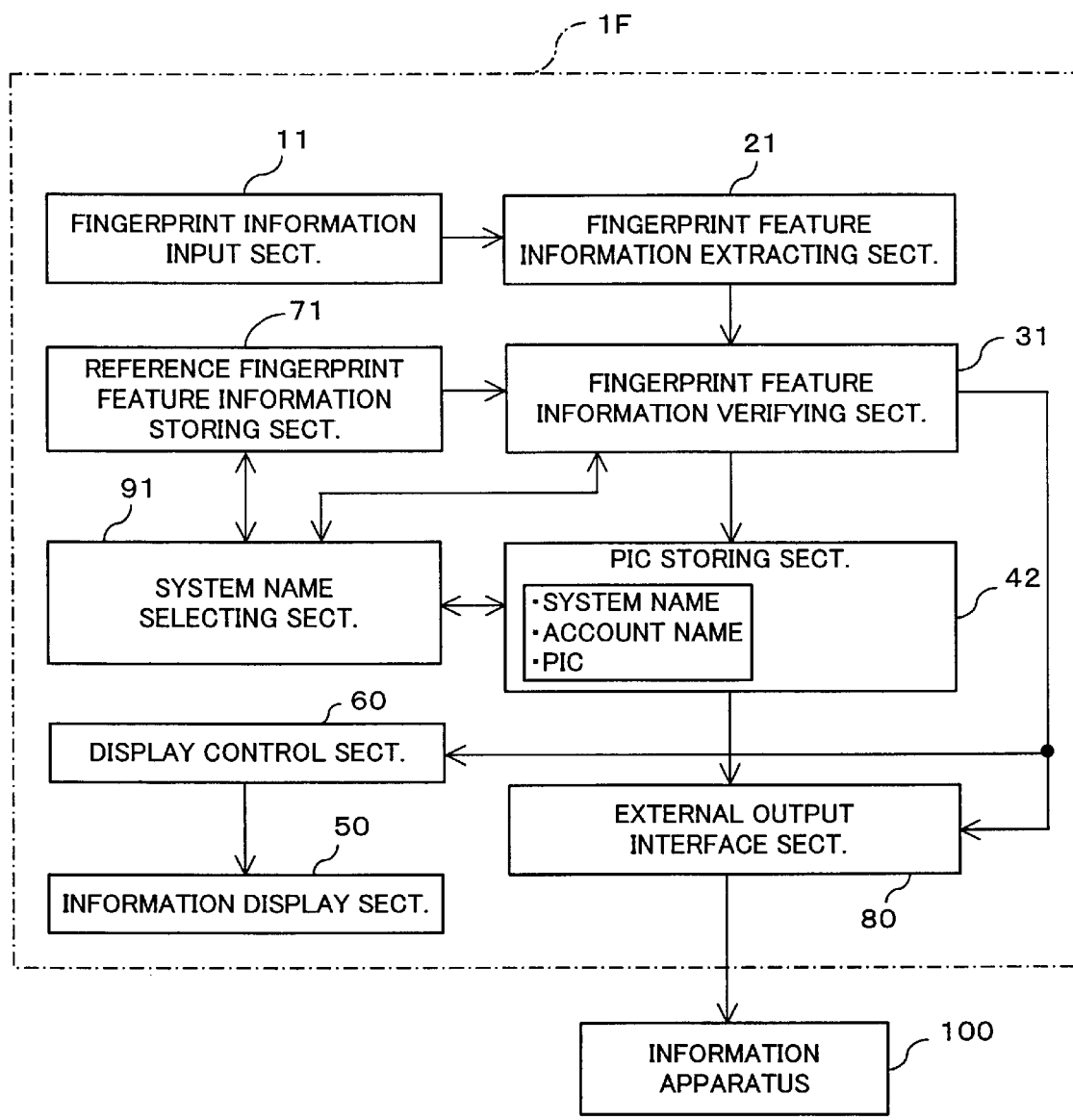
FIG. 9 is a block diagram showing a mobile electronic apparatus according to a sixth embodiment of the present invention.

(6) Sixth Embodiment:

FIG. 9 shows a mobile electronic apparatus according to a sixth embodiment of the present invention. The mobile electronic apparatus 1F of FIG. 9 is similar in construction to the mobile electronic apparatus 1E of the fifth embodiment of FIG. 8 except that the latter further comprises an external output interface section 80. Like reference numbers designate similar parts or elements throughout several views, so their detailed description is omitted here.

In the sixth embodiment, like in the second and the forth embodiments, the external output interface section (interface section) 80 is adapted to be connected to an information apparatus (external apparatus) 100, such as a mobile electronic terminal or a personal computer, for information input thereto. In the mobile electronic apparatus 1F of the sixth embodiment, fingerprint feature information for verification is compared with reference fingerprint feature information by the fingerprint feature information verifying section 31 to discriminate whether the fingerprint feature information for verification matches the reference fingerprint feature information. If the result of the verification is positive, a PIC and account information correlated with the generic information (system name, etc) selected by the system name selecting section 91 are read out from the PIC storing section 42 for being displayed on the display section 50 and being output to the external information apparatus 100 via the external output interface section 80.

With this mobile electronic apparatus 1F of the sixth embodiment, after a user is verified, a PIC (password, PIN, secret key, etc.) and account information (account name, ID, computer name, IP address, bank account number, etc.) which are correlated with the generic information (system name, application name, computer name, bank name, etc.) selected by the system name selecting section 91 can be output from the external output interface section 80 to the external information apparatus 100. Therefore, even if plural types of personal data (PICs) are stored, a user can selectively display the desired IPC and the desired account information for checking on the display section 50 using the generic information, and also can directly output the desired PIC and the desired account information to the external information apparatus 100, further improving the user-friendliness.

As shown in FIGS. 3 and 4, also in the mobile electronic apparatus 1F of the sixth embodiment, the reference fingerprint feature information storing section 71 may be substituted by the IC card interface section 72 and the reference fingerprint feature information read-out section 73, or by the reference fingerprint feature information read-out section 73 and the communications section 75, so that the reference biometrics feature information (reference fingerprint feature information) is received from an external apparatus.

Figure 10:
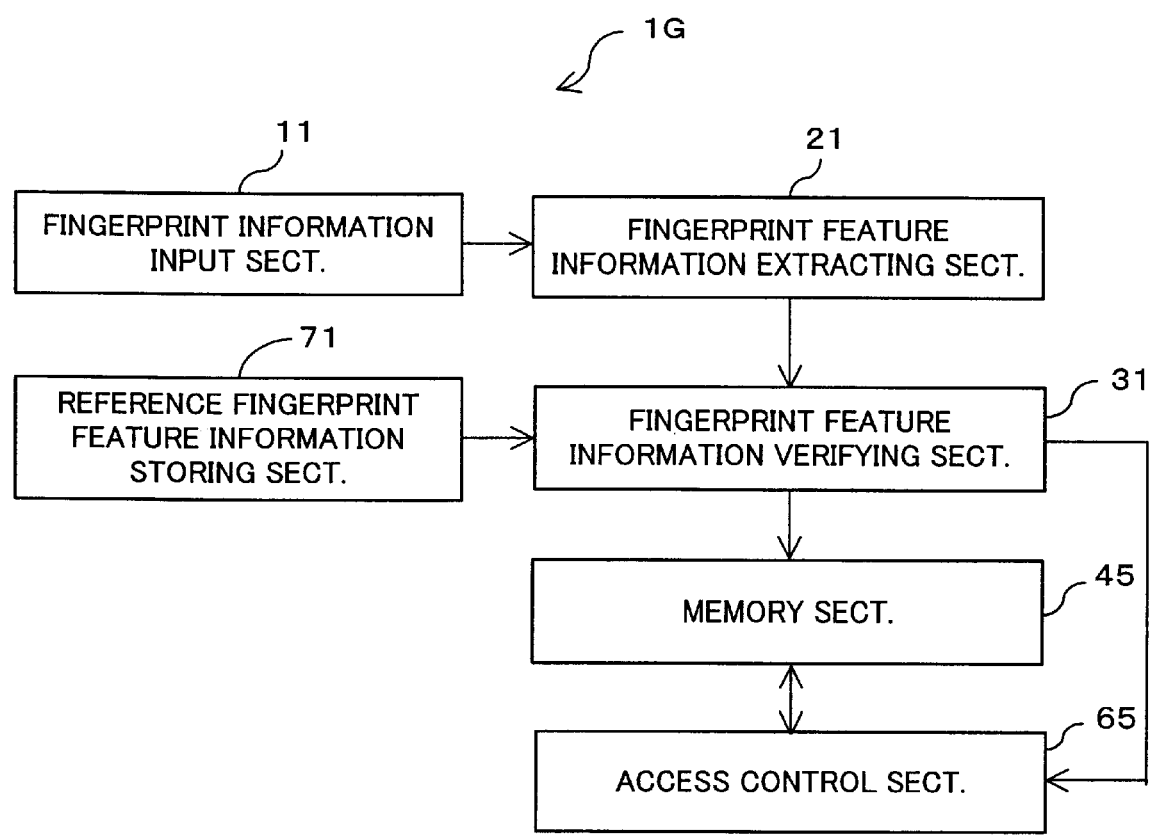
FIG. 10 is a block diagram showing a mobile electronic apparatus according to a seventh embodiment of the present invention.

(7) Seventh Embodiment:

FIG. 10 shows a mobile electronic apparatus according to a seventh embodiment of the present invention. The mobile electronic apparatus 1G of FIG. 10 is similar in construction to the mobile electronic apparatus 1A of the first embodiment of FIG. 2 except that the latter is equipped with a memory section 45 and an access control section 65 in place of the PIC storing section 40, the information display section 50, and the display control section 60. Like reference numbers designate similar parts or elements throughout several views, so their detailed description is omitted here.

Here, the memory section 45 stores and manages personal data (health insurance certificate number, medical information, personal information, etc.) of an authorized user of the mobile electronic apparatus. The access control section 65 controls access to the personal data stored in the memory section 45.

Then, fingerprint feature information for verification is compared with reference fingerprint feature information by the fingerprint feature information verifying section 31 to discriminate whether the fingerprint feature information for verification matches the reference fingerprint feature information. If the result of the verification is positive, the access control section 65 enables access (read-out, write-in, etc.) to the personal data stored in the memory section 45.

With this mobile electronic apparatus 1G of the seventh embodiment, if the fingerprint information input section 11, the fingerprint feature information extracting section 21, and the fingerprint feature information verifying section 31 recognize that the fingerprint feature information for verification matches an authorized user's fingerprint feature information, the personal data stored in the memory section 45 is allowed to be accessed. In this manner, the mobile electronic apparatus 1G becomes operable to manage and preserve the authorized user's personal data stored in the memory section 45 by fingerprint verification.

Thus it is possible to protect and guard the personal data stored in the mobile electronic apparatus 1G, by verifying a user with fingerprint information, which is free from being stolen or faked by an unauthorized user. Accordingly, the user must be verified using fingerprint information before making an access (read-out or write-in) to the personal data stored in the mobile electronic apparatus 1G, thus guaranteeing a highest degree of security.

As shown in FIGS. 3 and 4, also in the mobile electronic apparatus 1G of the seventh embodiment, the reference fingerprint feature information storing section 71 may be substituted by the IC card interface section 72 and the reference fingerprint feature information read-out section 73, or by the reference fingerprint feature information read-out section 73 and the communications section 75, so that the reference biometrics feature information (reference fingerprint feature information) is received from an external apparatus.

Figure 11:
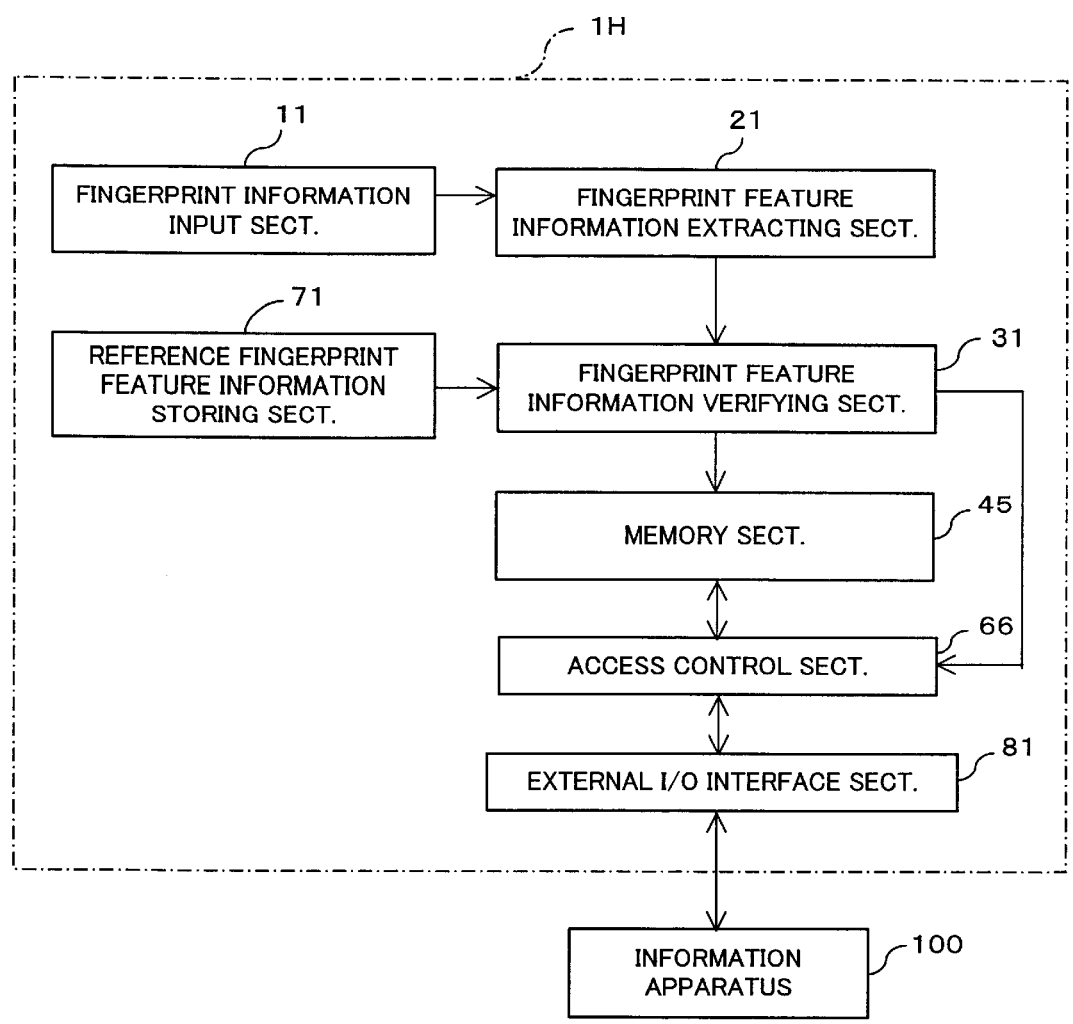
FIG. 11 is a block diagram showing a mobile electronic apparatus according to an eighth embodiment of the present invention.

(8) Eighth Embodiment:

FIG. 11 shows a mobile electronic apparatus according to an eighth embodiment of the present invention. The mobile electronic apparatus 1H of FIG. 11 is similar in construction to the mobile electronic apparatus 1G of the seventh embodiment of FIG. 10 except that the latter has an access control section 66 in place of the access control section 65 and is further equipped with an external I/O interface section 81. Like reference numbers designate similar parts or elements throughout several views, so their detailed description is omitted here.

The external I/O interface section (interface section) 81 is adapted to be connected to an information apparatus (external apparatus) 100 such as a mobile electronic terminal, a personal computer, or a portable telephone for information input thereto. The external I/O interface section (interface section) 81 is in the form of a universal serial bus (USB) terminal, an adaptor of a Smart Media (trade name of Toshiba Corporation), a network terminal, etc.

In the eighth embodiment, like the seventh embodiment, the access control section 66 controls access to the personal data stored in the memory 45. In the mobile electronic apparatus 1H of the eighth embodiment, fingerprint feature information for verification is compared with reference fingerprint feature information by the fingerprint feature information verifying section 31 to discriminate whether the fingerprint feature information for verification matches the reference fingerprint feature information. If the result of the verification is positive, the access control section 66 permits the information apparatus 100 to access (read-out, write-in, etc.) the personal data stored in the memory section 45 through the external I/O interface section 81. The memory section 45 of the mobile electronic apparatus 1H thereby becomes operable as an extended drive medium of the information apparatus 100.

With this mobile electronic apparatus 1H of the eighth embodiment, merely connecting the information apparatus 100, such as a mobile electronic information terminal, personal computer, or portable telephone, to the external I/O interface section 81 will never suffice to access to the personal data stored in the memory section 45. But after a user has been verified by his/her fingerprint, the external I/O interface section 81 will become operable as the extended drive medium of the information apparatus 100 to permit the information apparatus 100 to access the personal data. In other words, the memory section 45 in the mobile electronic apparatus 1H can be used as a portable storage device equipped with locking function by fingerprint information.

As shown in FIGS. 3 and 4, also in the mobile electronic apparatus 1F of the sixth embodiment, the reference fingerprint feature information storing section 71 may be substituted by the IC card interface section 72 and the reference fingerprint feature information read-out section 73, or by the reference fingerprint feature information read-out section 73 and the communications section 75, so that the reference biometrics feature information (reference fingerprint feature information) is received from an external apparatus.

Figure 12:
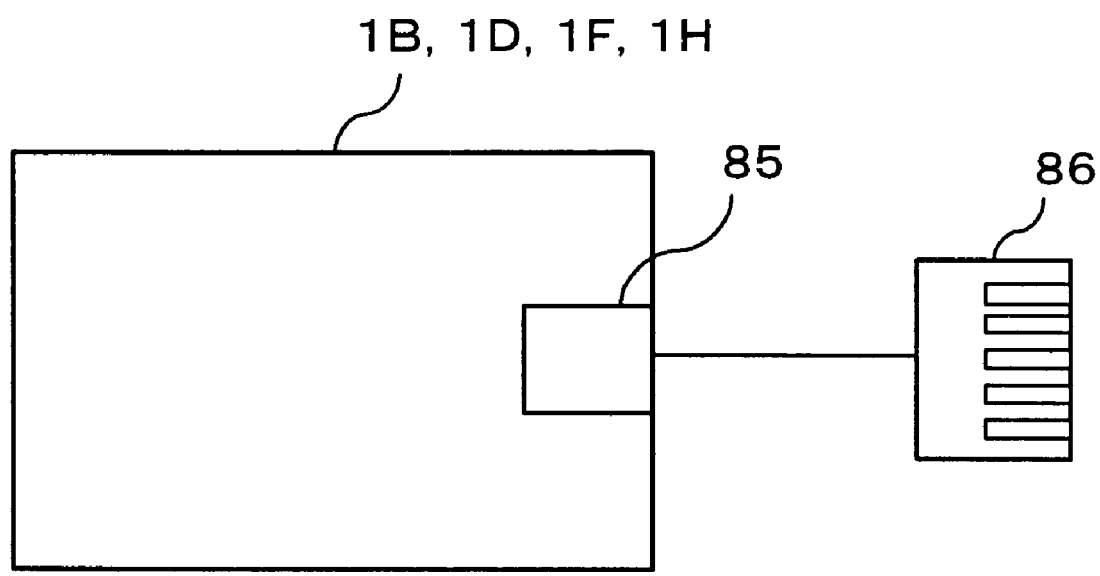
FIG. 12 is a block diagram showing a mobile electronic apparatus according to a ninth embodiment of the present invention.

(9) Ninth Embodiment:

FIG. 12 shows a mobile electronic apparatus according to a ninth embodiment of the present invention. In this embodiment, the above-described mobile electronic apparatus 1B, 1D, 1F, 1H (having the interface section 80 or the interface section 81) is equipped with an interface section, which is in the form of a detachable interface module section 85 so that the interface section is changed with another to meet the type of interface system of the information apparatus 100 to be connected to the mobile electronic apparatus 1B, 1D, 1F, 1H.

In the example shown in FIG. 12, Smart Media-compatible socket (interface section) 86 is equipped to the module section 85, making the mobile electronic apparatus 1B, 1D, 1F, 1H applicable to a Smart Media (trade name of Toshiba corporation).

In this manner, in the ninth embodiment, the interface section is detachable as a module, which can be changed to meet the type of an interface system (USB, serial/parallel, Smart Media (trade name of Toshiba Corporation), network terminal, etc.) of the information apparatus 100, making it possible to manufacture the mobile electronic apparatus 1B, 1D, 1F, 1H which is applicable in an easy way to various types of interface systems of the information apparatus 100.

Accordingly, whatever type of interface system the information apparatus 100 has, the mobile electronic apparatus 1B, 1D, 1F, 1H can be connected to the information apparatus 100 to serve as an external storage device.

Specifically, if connected to the information apparatus 100 having a USB-type interface, the interface section of the module section 85 is changed to the one applicable to USB. If connected to the information apparatus 100 in the form of a Smart Media (trade name of Toshiba Corporation), an interface section 86 for a Smart Media (trade name of Toshiba Corporation) maybe alternatively used as shown in FIG. 12.

Figure 13:
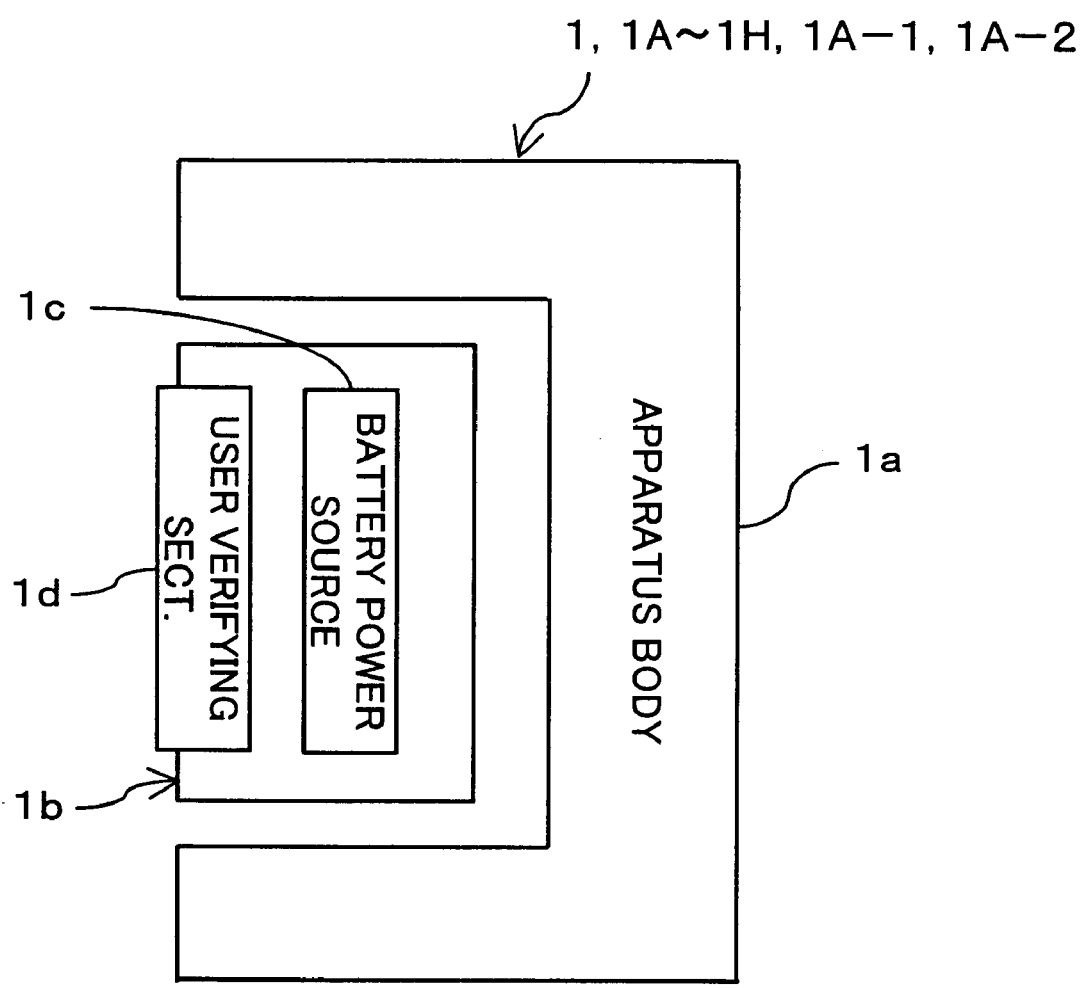
FIG. 13 is a block diagram showing a mobile electronic apparatus according to a tenth embodiment of the present invention.

(10) Tenth Embodiment:

FIG. 13 shows a mobile electronic apparatus according to a tenth embodiment of the present invention. In this embodiment, a battery power source case (battery pack) 1b, which is described hereabove as a detachable element of the mobile electronic apparatus 1, 1A through 1H, 1A-1, 1A-2, is equipped with at least an input section 10, has a user verifying section 1d.

Therefore, a battery power source case 1b equipped with the user verifying section 1d is mounted on an apparatus body 1a of an existing mobile electronic apparatus, thereby realizing the mobile electronic apparatus 1, 1A through 1H, 1A-1, 1A-2 having a function of verifying a user by biometrics information (fingerprint information). In this instance, a non-illustrated interface for sending to the apparatus body 1a biometrics information, or fingerprint information measured by the input section 10, 11 is included.

In the battery power source case (battery pack) 1b, a battery power source (battery itself) 1c is adapted to be detachable and replaceable.

Alternatively, the battery power source case 1b may be equipped with the input section 10, 11 and also the extracting section 20, 21 as the user verifying section 1d so that feature information extracted by the extracting section 20, 21 is sent to the apparatus body 1a. In another alternative form, the battery power source case 1b maybe equipped with the verifying section 30, 31 as the user verifying section 1d so that the result of the verification is sent to the apparatus body 1a.

In still another alternative form, the battery power source case 1b may be equipped with the following sections as the user verifying section 1d: the PIC storing section 40 through 42, the memory section 45, the information display section 50, the display control section 60, the access control section 65, 66, the feature information storing section 70, 71, the IC card interface section 72, the feature information read-out section 73, the communications section 75, the interface section 80, 81, the account selecting section 90, and the system name selecting section 91. That is, all the function of the mobile electronic apparatus 1, 1A through 1H, 1A-1, 1A-2 may be collected into the battery power source case (battery pack) 1b.

As described above, in the tenth embodiment, the battery power source case 1b, which is detachably mounted on the apparatus body 1a of the mobile electronic apparatus 1, 1A through 1H, 1A-1, 1A-2, and the user verifying section 1d are put together in a single composite form.

When extending an I/O function of the mobile electronic information terminal, an additional apparatus having a new I/O function is normally connected to the mobile electronic information apparatus via a cable so that the use of the mobile electronic information apparatus is limited to desktop use despite of its name "mobile".

In an ordinary mobile electronic apparatus such as a portable telephone, a battery pack, which is detachably mounted in the portable telephone, is replaced by another when it becomes wearing out (for example, when the workable time of the battery is very short even after fully recharged).

Both this battery pack and the function of user verification are built in a single composite form, thus making it possible to add an additional I/O function (a function of user verification by biometrics information in the present invention) to an existing mobile electronic apparatus without the risk of impairing the mobility of the mobile electronic apparatus and without making any modification to hardware.

Further, in this battery power source case (battery pack) 1b, only a battery power source (battery itself) 1c is detachable and replaceable so that the battery power source case (battery pack) 1b equipped with the user verifying section 1d is reusable.

(11) Other Modifications:

The present invention should by no means be limited to the above-illustrated embodiments, and various changes or modifications may be suggested without departing from the gist of the invention.

In the above description of the embodiments of the present invention, fingerprints are used as an example of biometrics information. Alternative types of biometrics information may be used; for example, iris, retina, palmprint, hand shape, voiceprint, facial recognition, signature dynamics, blood vessel pattern, key strokes may be either individually or in any combination.

Further, as substitute for biometrics information, a single-sign-on verification using a long password may be employed so that the long password can be used for verifying a user when the biometrics information cannot be used for a reason.

What is claimed is:

1. A mobile electronic apparatus equipped with a function of verifying a user using the user's biometrics information, said apparatus comprising:

an input section to measure biometrics information unique to a user to be verified and receive the biometrics information;

an extracting section to extract, from the biometrics information measured and received by said input section, biometrics feature information for verification;

a verifying section to compare the biometrics feature information, which is extracted by said extracting section, with reference biometrics feature information unique to an authorized user to verify whether the user's biometrics feature information matches the authorized user's reference biometrics feature information;

a storing section to store personal data of the authorized user, wherein said storing section stores the authorized user's personal data in correlation with designation information designating the personal data;

a display section to display various types of information;

a display control section to control a state of displaying on said display section, said display control section being operative, in response to the result of the verification by said verifying section being positive, to read out the personal data of the authorized user from said storing section and control said display section to display the personal data thereon; and a designation information selecting section, which selects the designation information so as to specify the personal data to be displayed on said display section;

wherein said display control section reads out from said storing section the personal data specified by the designation information selected by said designation information selecting section, and controls said display section to display the specified personal data thereon, in response to the result of the verification being positive.

2. The mobile electronic apparatus equipped with a function of verifying a user using the user's biometrics information according to claim 1, further comprising an interface section, adapted to be connected to an external apparatus to output the personal data specified by the designation information selected by said designation information selecting section to the external apparatus in response to the result of the verification being positive.

3. The mobile electronic apparatus equipped with a function of verifying a user using the user's biometrics information according to claim 1, wherein:

said personal data is a personal identification code including a password, a personal identification number, or a secret key; and said designation information is account information corresponding to the personal data and including an account name, an ID, a computer name, or an IP address.

4. The mobile electronic apparatus equipped with a function of verifying a user using the user's biometrics information according to claim 2, wherein:

said personal data is a personal identification code including a password, a personal identification number, or a secret key; and said designation information is account information corresponding to the personal data and including an account name, an ID, a computer name, or an IP address.

5. A mobile electronic apparatus equipped with a function of verifying a user using the user's biometrics information, said apparatus comprising:

an input section to measure biometrics information unique to a user to be verified and receive the biometrics information;

an extracting section to extract, from the biometrics information measured and received by said input section, biometrics feature information for verification;

a verifying section to compare the biometrics feature information, which is extracted by said extracting section, with reference biometrics feature information unique to an authorized user to verify whether the user's biometrics feature information matches the authorized user's reference biometrics feature information;

a storing section to store personal data of the authorized user, wherein said storing section stores the authorized user's personal data in correlation with both designation information designating the personal data and generic information that specifies both the personal data and the designation information;

a display section to display various types of information;

a display control section to control a state of displaying on said display section, said display control section being operative, in response to the result of the verification by said verifying section being positive, to read out the personal data of the authorized user from said storing section and control said display section to display the personal data thereon; and a generic information selecting section to select the generic information specifying both the personal data and the designation information to be displayed on said display section;

wherein said display control section reads out from said storing section the personal data and the designation information, which are specified by the generic information selected by said generic information selecting section, and controls said display section to display the specified personal data and designation information thereon, in response to the result of the verification being positive.

6. The mobile electronic apparatus equipped with a function of verifying a user using the user's biometrics information according to claim 5, further comprising an interface section, adapted to be connected to an external apparatus to output the personal data and the designation information, which are specified by the generic information selected by said generic information selecting section, to the external apparatus in response to the result of the verification being positive.

7. The mobile electronic apparatus equipped with a function of verifying a user using the user's biometrics information according to claim 5, wherein:

said personal data is a personal identification code including a password, a personal identification number, or a secret key;

said designation information is account information corresponding to the personal data and including an account name, an ID, a computer name, or an IP address; and said generic information is a system name corresponding to the account information.

8. The mobile electronic apparatus equipped with a function of verifying a user using the user's biometrics information according to claim 6, wherein:

said personal data is a personal identification code including a password, a personal identification number, or a secret key;

said designation information is account information corresponding to the personal data and including an account name, an ID, a computer name, or an IP address; and said generic information is a system name corresponding to the account information.

9. The mobile electronic apparatus equipped with a function of verifying a user using the user's biometrics information according to claim 5, wherein said authorized user is an owner of the mobile electronic apparatus.

10. The mobile electronic apparatus equipped with a function of verifying a user using the user's biometrics information according to claim 9, further comprising an interface section, adapted to be connected to an external apparatus, to output the personal data to the external apparatus in response to the result of the verification by said verifying section being positive.

11. The mobile electronic apparatus equipped with a function of verifying a user using the user's biometrics information according to claim 5, wherein said personal data is a personal identification code including a password, a personal identification number, or a secret key.

12. The mobile electronic apparatus equipped with a function of verifying a user using the user's biometrics information according to claim 10, wherein said personal data is a personal identification code including a password, a personal identification number, or a secret key.

13. The mobile electronic apparatus equipped with a function of verifying a user using the user's biometrics information according to claim 5, further comprising another storing section to previously store the reference biometrics feature information.

14. The mobile electronic apparatus equipped with a function of verifying a user using the user's biometrics information according to claim 9, further comprising:

a medium interface section adapted to be connected to a portable memory medium previously storing the reference biometrics feature information; and a read-out section to read out the reference biometrics feature information from said portable memory medium through said medium interface section.

15. The mobile electronic apparatus equipped with a function of verifying a user using the user's biometrics information according to claim 14, wherein said portable memory medium is an IC card.

16. The mobile electronic apparatus equipped with a function of verifying a user using the user's biometrics information according to claim 5, further comprising a communications section, adapted to be communicably connected to an external apparatus, to receive the reference biometrics feature information from the external apparatus.

17. A mobile electronic apparatus equipped with a function of verifying a user using the user's biometrics information; said apparatus comprising:
an input section to measure biometrics information unique to a user to be verified and receive the biometrics information;
an extracting section to extract, from the biometrics information measured and received by said input section, biometrics feature information for verification;
a verifying section to compare the biometrics feature information, which is extracted by said extracting section, with reference biometrics feature information unique to an authorized user to verify whether the user's biometrics feature information matches the authorized user's reference biometrics feature information;
a storing section to store personal data of the authorized user;
a display section to display various types of information; and
a display control section to control a state of displaying on said display section, said display control section being operative, in response to the result of the verification by said verifying section being positive, to read out the personal data of the authorized user from said storing section and control said display section to display the personal data thereon;
wherein at least said input section is disposed on a detachable element of said mobile electronic apparatus.

18. The mobile electronic apparatus equipped with a function of verifying a user using the user's biometrics information according to claim 17, wherein said detachable element is a battery pack.

19. The mobile electronic apparatus equipped with a function of verifying a user using the user's biometrics information according to claim 18, wherein said authorized user is an owner of the mobile electronic apparatus.

20. The mobile electronic apparatus equipped with a function of verifying a user using the user's biometrics information according to claim 17, further comprising another storing section to previously store the reference biometrics feature information.

21. The mobile electronic apparatus equipped with a function of verifying a user using the user's biometrics information according to claim 17, further comprising:
a medium interface section adapted to be connected to a portable memory medium previously storing the reference biometrics feature information; and
a read-out section to read out the reference biometrics feature information from said portable memory medium through said medium interface section.

22. The mobile electronic apparatus equipped with a function of verifying a user using the user's biometrics information according to claim 21, wherein said portable memory medium is an IC card.

23. The mobile electronic apparatus equipped with a function of verifying a user using the user's biometrics information according to claim 17, further comprising a communications section, adapted to be communicably connected to an external apparatus, to receive the reference biometrics feature information from the external apparatus.

24. A mobile electronic apparatus equipped with a function of verifying a user using the user's biometrics information, said apparatus comprising:
an input section to measure biometrics information unique to a user to be verified and receive the biometrics information;
an extracting section to extract, from the biometrics information measured and received by said input section, biometrics feature information for verification;
a verifying section to compare the biometrics feature information, which is extracted by said extracting section, with reference biometrics feature information unique to an authorized user to verify whether the user's biometrics feature information matches the authorized user's reference biometrics feature information;
a memory section to store personal data of the authorized user; and
an access control section to control access to the personal data, which is stored in said memory section, in response to the result of said verification being positive;
wherein at least said input section is disposed on a detachable element of said mobile electronic apparatus.

25. The mobile electronic apparatus equipped with a function of verifying a user using the user's biometrics information according to claim 24, wherein said detachable element is a battery pack.

26. The mobile electronic apparatus equipped with a function of verifying a user using the user's biometrics information according to claim 24, further comprising an interface section, adapted to be connected to an information apparatus, to input and output the personal data from and to the information apparatus through said interface section in response to the result of the verification being positive.

27. The mobile electronic apparatus equipped with a function of verifying a user using the user's biometrics information according to claim 26, wherein said memory section functions as an extended drive medium of said information apparatus.

28. The mobile electronic apparatus equipped with a function of verifying a user using the user's biometrics information according to claim 24, wherein the type of said interface section is selected in accordance with an interface system of said information apparatus.

29. The mobile electronic apparatus equipped with a function of verifying a user using the user's biometrics information according to claim 26, wherein the type of said interface section is selected in accordance with an interface system of said information apparatus.

30. The mobile electronic apparatus equipped with a function of verifying a user using the user's biometrics information according to claim 27, wherein the type of said interface section is selected in accordance with an interface system of said information apparatus.

31. The mobile electronic apparatus equipped with a function of verifying a user using the user's biometrics information according to claim 24, further comprising a storing section to previously store the reference biometrics feature information.

32. The mobile electronic apparatus equipped with a function of verifying a user using the user's biometrics information according to claim 24, further comprising:
a medium interface section, adapted to be connected to a portable memory medium previously storing the reference biometrics feature information, and
a read-out section to read out the reference biometrics feature information from said portable memory medium through said medium interface section.

33. The mobile electronic apparatus equipped with a function of verifying a user using the user's biometrics information according to claim 32, wherein said portable memory medium is an IC card.

34. The mobile electronic apparatus equipped with a function of verifying a user using the user's biometrics information according to claim 24, further comprising a communications section, adapted to be communicably connected to an external apparatus, to receive the reference biometrics feature information from the external apparatus.

* * * * *